(12) United States Patent
Szucs et al.

(10) Patent No.: US 11,973,815 B2
(45) Date of Patent: Apr. 30, 2024

(54) NETWORK ASSISTANCE FOR UPLINK STREAMING (71) Applicant: Sony Corporation, Tokyo (JP)

(72) Inventors: Paul Szucs, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 488 days.

(21) Appl. No.: 16/646,926

(22) PCT Filed: Aug. 30, 2018

(86) PCT No.: PCT/US2018/048697
§ 371 (c)(1),
(2) Date: Mar. 12, 2020

(87) PCT Pub. No.: WO2019/070353
PCT Pub. Date: Apr. 11, 2019

(65) Prior Publication Data
US 2020/0213371 A1 Jul. 2, 2020

Related U.S. Application Data (60) Provisional application No. 62/567,541, filed on Oct. 3, 2017.

(51) Int. Cl.
*G06F 15/173* (2006.01)
*H04L 65/612* (2022.01)
(Continued)

(52) U.S. Cl.
CPC ............ *H04L 65/612* (2022.05); *H04L 65/65* (2022.05); *H04L 65/762* (2022.05); *H04L 65/80* (2013.01);
(Continued)

(58) Field of Classification Search
CPC ......... H04N 21/2743; H04N 21/23439; H04N 21/8456; H04N 21/41407; H04L 65/80;
(Continued)

(56) References Cited

U.S. PATENT DOCUMENTS 9,772,839 B2 * 9/2017 Hong ............... H04L 67/12
10,271,345 B2 * 4/2019 Wang ............... H04N 21/64792
(Continued)

FOREIGN PATENT DOCUMENTS

EP 2735077 A2 5/2014
EP 2735077 B1 6/2017
(Continued)

OTHER PUBLICATIONS

3rd Generation Partnership Project: Technical Specification Group Services and System Aspects; Study on Server and Network-assisted DASH (SAND) for 3GPP Multimedia Services (Release 14); 3GPP TR 26.957, vo. 73.01; 42 pages.
(Continued)

*Primary Examiner* — Suraj M Joshi
*Assistant Examiner* — Hao H Nguyen
(74) *Attorney, Agent, or Firm* — Tucker Ellis LLP (57) ABSTRACT Network assistance is provided for the streaming of data from a user equipment (UE) (14) to an ingestion point (12) in a network. The network assistance may include establishing an uplink network assistance (UNA) session with a network assistance service of the network; while streaming of the data and for each segment of the data or each UNA period of the data, receiving from the network assistance service an indication of a recommended highest bit rate estimate with which the data may be streamed under current network conditions. The UE may adjust content of the data stream in accordance with the indication of the recommended highest bit rate estimation.

15 Claims, 2 Drawing Sheets (51) Int. Cl.
*H04L 65/65* (2022.01)
*H04L 65/75* (2022.01)
*H04L 65/80* (2022.01)
*H04L 67/02* (2022.01)
*H04N 21/2343* (2011.01)
*H04N 21/845* (2011.01)

(52) U.S. Cl.
CPC ....... *H04L 67/02* (2013.01); *H04N 21/23439* (2013.01); *H04N 21/8456* (2013.01)

(58) Field of Classification Search
CPC ..... H04L 65/65; H04L 65/762; H04L 65/612; H04L 67/02; H04B 17/309; H04W 72/0413; H04W 28/0289; H04W 28/0967
See application file for complete search history.

(56) References Cited

U.S. PATENT DOCUMENTS

| | | | | |
|---|---|---|---|---|
| 10,701,119 | B2* | 6/2020 | Oyman | H04N 21/44209 |
| 11,165,680 | B2* | 11/2021 | Bar-Yanai | H04N 21/2402 |
| 2008/0133839 | A1* | 6/2008 | Schmidt | G06F 12/0866 |
| | | | | 711/E12.019 |
| 2013/0042276 | A1* | 2/2013 | Payette | H04W 28/22 |
| | | | | 725/62 |
| 2013/0308589 | A1* | 11/2013 | Liu | H04W 72/21 |
| | | | | 370/329 |
| 2013/0322235 | A1* | 12/2013 | Khoryaev | H04L 5/1469 |
| | | | | 370/229 |
| 2014/0189760 | A1* | 7/2014 | Payette | H04N 21/64738 |
| | | | | 725/86 |
| 2014/0359166 | A1* | 12/2014 | Mamidwar | H04L 65/765 |
| | | | | 709/246 |
| 2015/0032854 | A1 | 1/2015 | Wang et al. | |
| 2015/0244794 | A1* | 8/2015 | Poletto | G06F 16/51 |
| | | | | 715/748 |
| 2015/0296418 | A1* | 10/2015 | Szilagyi | H04W 36/0016 |
| | | | | 370/331 |
| 2016/0100329 | A1* | 4/2016 | Miller | H04W 28/0268 |
| | | | | 370/235 |
| 2016/0142745 | A1* | 5/2016 | Fisher | H04N 21/4334 |
| | | | | 725/62 |
| 2016/0192029 | A1* | 6/2016 | Bergstrom | H04N 21/251 |
| | | | | 709/219 |
| 2016/0335073 | A1* | 11/2016 | Hong | H04W 48/18 |
| 2016/0373546 | A1 | 12/2016 | Lotfallah et al. | |
| 2017/0004323 | A1* | 1/2017 | Balachandran | G06F 16/13 |
| 2017/0093942 | A1* | 3/2017 | Danielsson | H04W 84/042 |
| 2017/0142218 | A1* | 5/2017 | Fieau | H04L 65/1069 |
| 2017/0339437 | A1* | 11/2017 | Lee | H04N 21/2383 |
| 2018/0139254 | A1* | 5/2018 | Oyman | H04N 21/23439 |
| 2018/0192452 | A1* | 7/2018 | Nylander | H04W 76/10 |
| 2018/0205802 | A1* | 7/2018 | Bowen | H04L 43/0894 |
| 2018/0261307 | A1* | 9/2018 | Couse | H04L 63/0428 |
| 2018/0302455 | A1* | 10/2018 | Bordoloi | H04N 19/115 |
| 2018/0367579 | A1* | 12/2018 | Kolan | H04L 65/61 |
| 2019/0159071 | A1* | 5/2019 | Yavuz | H04L 65/65 |
| 2019/0350025 | A1* | 11/2019 | Eriksson | H04W 24/08 |
| 2019/0379720 | A1* | 12/2019 | Yu | H04L 65/65 |
| 2019/0394498 | A1* | 12/2019 | Lo | H04N 21/239 |
| 2020/0059818 | A1* | 2/2020 | Chang | H04W 28/22 |
| 2021/0105333 | A1* | 4/2021 | Chen | H04L 67/02 |
| 2021/0219184 | A1* | 7/2021 | Yavuz | H04L 65/65 |

FOREIGN PATENT DOCUMENTS

| | | |
|---|---|---|
| JP | 2017126941 A | 7/2017 |
| WO | 2013014917 A2 | 1/2013 |
| WO | 2016054485 A1 | 4/2016 |
| WO | 2017186372 A1 | 11/2017 |

OTHER PUBLICATIONS

International Search Report and Written Opinion from corresponding International Application No. PCT/US2018/048697, dated Dec. 11, 2018, 20 pages.
3GPP TR 26.957, "Study on Server and Network-assisted DASH (SAND) for 3GPP Multimedia Services", 3rd Generation Partnership Project, Sep. 9, 2016, vol. 7, Release 14, 42 pages.

* cited by examiner

NETWORK ASSISTANCE FOR UPLINK STREAMING

TECHNICAL FIELD OF THE INVENTION

The technology of the present disclosure relates generally to wireless communications among electronic devices in a network environment and, more particularly, to methods of providing and employing network assistance during uplink steaming, and related devices.

BACKGROUND

In a network, such as a cellular or mobile network, a client device may stream media content to an ingestion point of the network. For instance, a professional video camera used to cover a live sporting or news event may provide an audiovisual stream in an uplink transmission. Other devices also may live stream audiovisual content to a network, such as a wireless handheld device in the form of a smart phone, a tablet computer or similar device.

In these examples, the client device, as the source of the media stream, is conventionally configured to transmit data with the highest bit rate that the client can generate. The format (also referred to as quality or version) of the content is typically fixed, but some devices may have encoders that are capable of providing plural formats. For instance, an audiovisual stream could include, for example, one of standard definition (SD) video, high definition (HD) video, or a 180-degree or 360-degree virtual reality (VR) stream. Even within these video format categories, one or more video formats may exist.

Exemplary problems that arise with such an uplink media stream include the following. One problem is that the terminal device is not able to reliably estimate the uplink data rate capacity of the network data transfer path between the client and the ingestion point. As one example in a cellular network this path could consist of a wireless interface, where channel fading, interference and variations in network load could impact the instantaneous data rate capacity. Therefore, the terminal device could start to provide the media stream at a lower bit rate and quality than the uplink could actually handle, or the terminal could start to provide the media stream at such a high bit rate so as to cause loss of uplink data due to insufficient capacity to carry the media stream. Another problem is that temporary bandwidth limitations in the transmission link from the terminal to the network can cause media streaming buffer underflow in the network ingestion point and any remote consumer of the stream. This may lead to stalling of media playback and dissatisfaction in the viewer experience. There also may be deficiencies in buffer control at the ends of the uplink. It will be appreciated that other issues and technical implementation challenges may be addressed by the disclosed techniques.

Relatively few approaches to improving uplink streaming performance have been proposed. Some approaches have been proposed in U.S. Patent Application Publication No. US 2016/0100329, which discloses adjusting the format of a video stream in response to changing network conditions as determined by the terminal device. Even still, there remains a need to further improve streaming through an uplink channel.

SUMMARY

Disclosed are features that may enhance the quality of experience (QoE) of uplink media streaming services (i.e., when a service ingestion point in a network receives content from a user terminal). The disclosed features may improve the QoE specifically when operating on a network where spectrum resources are shared among multiple users, for example in a wireless mobile or cellular network according to any appropriate set of standards such as those promulgated by 3GPP.

According to one aspect of the disclosure, a method of streaming data from a user equipment (UE) to an ingestion point in a network includes establishing an uplink network assistance (UNA) session with a network assistance service of the network; and while streaming of the data and for one or more segments of the data or an UNA period of the data, receiving from the network assistance service an indication of a recommended highest bit rate estimate with which the data may be streamed under current network conditions.

According to one embodiment of the method, the UE selects a data stream configuration from an available set of capabilities to supply an uplink media stream that complies with the recommendation.

According to one embodiment of the method, the network assistance service is hosted by a network element configured to provide UNA services using standard message envelopes that support network assistance under dynamic adaptive streaming over hypertext transfer protocol (HTTP) (DASH), the network element being a DASH-aware network element (DANE).

According to one embodiment of the method, the standard message envelopes are server and network assisted DASH (SAND) message envelopes.

According to one embodiment of the method, the data is streamed according to protocol that employs a continuous stream.

According to one embodiment of the method, the data is segmented for the UNA by logically dividing the data at the UE into lengths corresponding to a predetermined duration of audiovisual content even though streaming transmission of the data is carried out continuously.

According to one embodiment of the method, the data is segmented for transmission according to data streaming protocol that defines data segmentation.

According to one embodiment of the method, the UNA period is defined by a predetermined number of segment lengths.

According to one embodiment of the method, the method further includes, in response to a cache command from the network assistance service, caching one or more segments of the data.

According to one embodiment of the method, the method further includes sending multiple cached segments in bulk.

According to one embodiment of the method, the method further includes receiving a request from the ingestion point to change a quality level of the content of the data stream to a requested quality level; and requesting confirmation from the network assistance service that the quality level requested by the network ingestion point is recommended under current network transmission conditions.

According to one embodiment of the method, the UE is authenticated to the network assistance service as part of a UNA message sent to the network assistance service as having pre-arranged authorization to be granted access to at least one of the UNA services or priority access to network bandwidth resources.

According to one embodiment of the method, the UNA message conforms to a standard message envelope to support network assistance under dynamic adaptive streaming over hypertext transfer protocol (HTTP) (DASH) and one or more fields of the UNA message conveys an authentication code or security token.

According to another aspect of the disclosure, a method of providing uplink network assistance (UNA) by a network assistance service to a user equipment (UE) during streaming of data from the UE to an ingestion point in a network includes establishing an uplink network assistance (UNA) session with the UE; while streaming of the data and for one or more segments of the data or an UNA period of the data, receiving from the UE a network assistance request; and responding to the UE with a network assistance response indicating a highest bit rate recommendation with which the data may be streamed under current network conditions.

According to one embodiment of the method, the network assistance service is hosted by a network element configured to provide UNA services using standard message envelopes that support network assistance under dynamic adaptive streaming over hypertext transfer protocol (HTTP) (DASH), the network element being a DASH-aware network element (DANE).

According to one embodiment of the method, the standard message envelopes are server and network assisted DASH (SAND) message envelopes.

According to one embodiment of the method, the method further includes sending a cache command to the UE for the UE to cache one or more segments of the data.

According to one embodiment of the method, the method further includes authenticating that the UE is eligible for UNA services or priority access to network bandwidth resources by verifying data in a UNA message received from the UE.

According to one embodiment of the method, the UNA message conforms to a standard message envelope to support network assistance under dynamic adaptive streaming over hypertext transfer protocol (HTTP) (DASH) and one or more fields of the UNA message conveys an authentication code or security token.

According to another aspect of the disclosure, a method of streaming data from a user equipment (UE) to an ingestion point in a network includes transmitting the data according to a streaming protocol during an uplink network assistance (UNA) session with a network assistance service; receiving a cache command from the network assistance service; and in response to the cache command, caching one or more segments of the data.

According to one embodiment of the method, the method further includes sending multiple cached segments in bulk.

According to one embodiment of the method, the data is streamed according to protocol that employs a continuous stream.

According to one embodiment of the method, the data is segmented for the UNA by logically dividing the data at the UE into lengths corresponding to a predetermined duration of audiovisual content even though streaming transmission of the data is carried out continuously.

According to one embodiment of the method, the data is segmented for transmission according to data streaming protocol that defines data segmentation.

According to another aspect of the disclosure a method of streaming content from a user equipment (UE) to an ingestion point (12) in a network includes streaming data for the content to the ingestion point; and providing information for the ingestion point or a network assistance service to access a media player description (MPD) containing a machine-readable description of the available versions of the content.

According to one embodiment of the method, the MPD is dynamic adaptive streaming over hypertext transfer protocol (HTTP) (DASH) compliant.

According to one embodiment of the method, the information specifies a location of the MPD.

According to one embodiment of the method, the location is hosted by the UE.

According to one embodiment of the method, the location is hosted by a device with which the ingestion point or network assistance service can communicate over a network medium.

According to one embodiment of the method, the information is the MPD.

According to one embodiment of the method, the MPD and available versions of the content are static.

According to one embodiment of the method, the MPD and available versions of the content are dynamically adjusted by the UE according to current network conditions.

According to one embodiment of the method, the method further includes streaming a requested selection of one of the versions of the content in the data streamed to the ingestion point.

DETAILED DESCRIPTION OF EMBODIMENTS

A. Introduction

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for conducting wireless radio communications that include network assistance for uplink streaming. The network assistance for uplink streaming may be carried out in an automated manner by the respective devices. The network assistance for uplink streaming may improve uplink streaming performance.

B. System Architecture

Figure 1:
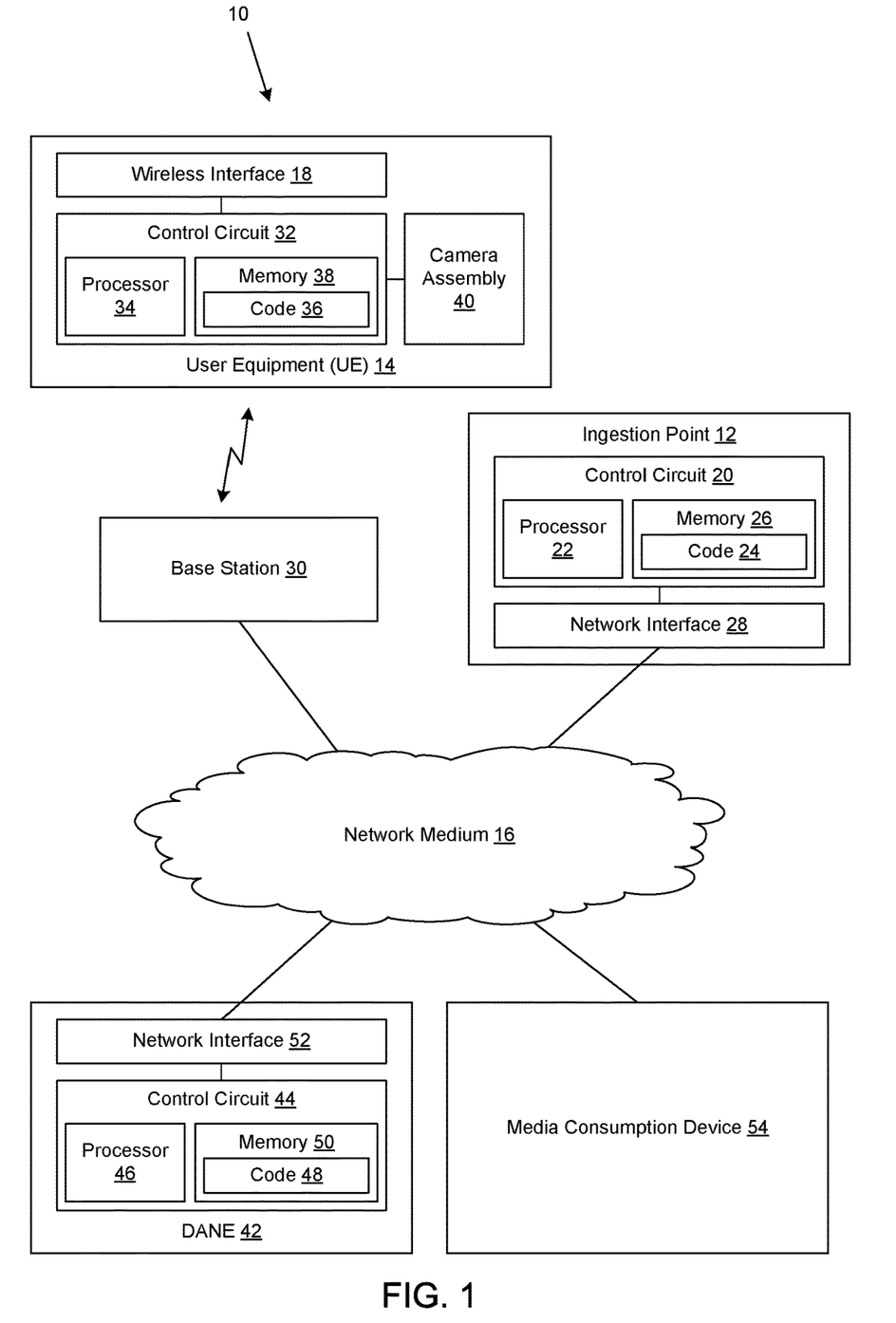
FIG. 1 is a schematic block diagram of a representative network system that conducts network assistance for uplink streaming.

FIG. 1 is a schematic diagram of an exemplary network system 10 for implementing the disclosed techniques. It will be appreciated that the illustrated system is representative and other systems may be used to implement the disclosed techniques. The exemplary network system 10 includes an ingestion point 12 for data streamed by an uplink from a user equipment (UE) 14. The ingestion point 12 typically will be a server or other device located in and/or managed by a core network of a wireless mobile or cellular network operator. Clients for the ingested media stream also may be reachable via the operator's core network, or over a wider network such as the Internet. The ingestion point 12 also may be referred to as a framework for live uplink streaming (FLUS)

sink and the user equipment 14 also may be referred to as a FLUS source, and these devices may operate in accordance with FLUS or enhancements to FLUS (E-FLUS) conventions.

The UE 14 transmits data and control signaling via a base station 30 or other access point that operates in accordance with a cellular or mobile device network protocol such as, but not limited to a protocol promulgated by the 3rd Generation Project Partnership (3GPP). An exemplary base station 30 may be a long term evolution (LTE) base station, often referred to as an enhanced Node B (eNodeB or eNB). The base station 30 services one or more electronic devices, including the UE 14. The base station 12 may support communications between the electronic devices and a network medium 16 through which the electronic devices may communicate with other electronic devices, servers, which can be connected within the operator's core network, or via the Internet, etc. One device that the UE 14 may communicate with via the network medium 16 is the ingestion point 12. It will be understood that other location in the network architecture for the ingestion point are possible. As an example of another location of the ingestion point 12, the ingestion point 12 may be a server on the Internet for streaming services that are not managed by a wireless network operator.

The source of the streamed data may be any client or terminal of the base station 12. In accordance with the general terminology adopted in 3GPP specifications, the source of the streamed data will be referred to as the UE 14. The UE 14 may be any kind of electronic device that provides a media stream via a wireless interface 18 (e.g., a 3GPP wireless modem). Exemplary UEs 14 include, but are not limited to, a smart phone, a tablet computer, a desktop or laptop computer, a video camera, etc. In the case of a video camera, the video camera may be included in a drone, may be operated by a person, may be an autonomous surveillance camera, etc. In one embodiment, the video camera may be a professional style camera used by a news or live event reporting organization. The UE 14 also may be the source of a contribution feed that is transmitted via an uplink, such as an outside-broadcast van or mobile studio that transmits a contribution feed as an aggregate of several cameras or other device feeds, or as a pre-produced edit and audio mix of an event being covered. The video camera may include the wireless interface 18 or may be operatively connected through a local interface to the wireless interface 18 using a cable or electrical connector, for example. In the case of a video camera operated by a news or live event reporting organization, the organization may make an arrangement with the operator of the mobile network to provide enhanced bandwidth capacity to support audiovisual content streaming. For example, the video camera may have access to multiple carriers in the network to deliver content using carrier aggregation. The wireless network could also provide sufficient bandwidth capacity for the media stream in a single carrier or channel.

The ingestion point 12 may include operational components for carrying out wireless communications and other functions of the ingestion point 12. For instance, the ingestion point 12 may include a control circuit 20 that is responsible for overall operation of the ingestion point 12, including controlling the ingestion point 12 to carry out the operations applicable to the ingestion point 12 and described in greater detail below. The control circuit 20 includes a processor 22 that executes code 24, such as an operating system and/or other applications. The functions described in this disclosure document and applicable to the ingestion point 12 may be embodied as part of the code 24 or as part of other dedicated logical operations of the ingestion point 12. The logical functions and/or hardware of the ingestion point 12 may be implemented in other manners depending on the nature and configuration of the ingestion point 12. Therefore, the illustrated and described approaches are just examples and other approaches may be used including, but not limited to, the control circuit 20 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 24 and any stored data (e.g., data associated with the operation of the ingestion point 12) may be stored on a memory 26. The code 24 may be embodied in the form of executable logic routines (e.g., a software program) that are stored as a computer program product on a non-transitory computer readable medium (e.g., the memory 26) of the ingestion point 12 and are executed by the processor 22. The functions described as being carried out by the ingestion point 12 may be thought of as methods that are carried out by the ingestion point 12.

The memory 26 may be, for example, one or more of a buffer, a flash memory, a hard drive, a removable media, a volatile memory, a non-volatile memory, a random access memory (RAM), or other suitable device. In a typical arrangement, the memory 26 includes a non-volatile memory for long term data storage and a volatile memory that functions as system memory for the control circuit 20. The memory 26 is considered a non-transitory computer readable medium.

The ingestion point 12 includes communications circuitry that enables the ingestion point 12 to establish various communication connections. For instance, the ingestion point 12 may have a network communication interface 28 to communicate with the network medium 16.

The UE 14 may include operational components for carrying out various functions of the UE 14 including wireless communications with the base station 30 and any other devices with which the UE 14 may communicate. One function of the UE 14 is network assisted uplink streaming as will be described in greater detail. Among other components, the UE 14 may include a control circuit 32 that is responsible for overall operation of the UE 14, including controlling the UE 14 to carry out the operations described in greater detail below. The control circuit 32 includes a processor 34 that executes code 36, such as an operating system and/or other applications. The functions described in this disclosure document may be embodied as part of the code 36 or as part of other dedicated logical operations of the UE 14. The logical functions and/or hardware of the UE 14 may be implemented in other manners depending on the nature and configuration of the UE 14. Therefore, the illustrated and described approaches are just examples and other approaches may be used including, but not limited to, the control circuit 32 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 36 and any stored data (e.g., data associated with the operation of the UE 14) may be stored on a memory 38. The code 36 may be embodied in the form of executable logic routines (e.g., a software program) that are stored as a computer program product on a non-transitory computer readable medium (e.g., the memory 38) of the UE 14 and are executed by the processor 34. The functions described as being carried out by the UE 14 may be thought of as methods that are carried out by the UE 14.

The memory 38 may be, for example, one or more of a buffer, a flash memory, a hard drive, a removable media, a volatile memory, a non-volatile memory, a random access memory (RAM), or other suitable device. In a typical arrangement, the memory 38 includes a non-volatile memory for long term data storage and a volatile memory that functions as system memory for the control circuit 32. The memory 38 is considered a non-transitory computer readable medium.

The UE 14 includes communications circuitry that enables the UE 14 to establish various communication connections. For instance, the UE 14 includes the wireless interface 18 over which wireless communications are conducted with the base station 30. Other communications may be established with the UE 14, such as Wi-Fi communications, wired connections, etc. The wireless interface 18 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the UE 14 may include, but are not limited to, user inputs (e.g., buttons, keypads, touch surfaces, etc.), a display, a microphone, a speaker, a sensor, a jack or electrical connector, a rechargeable battery and power supply unit, a SIM card, a motion sensor (e.g., accelerometer or gyro), a GPS receiver, and any other appropriate components. In particular, the UE 14 may include a camera assembly 40 with all appropriate optical and electronic imaging components, as well as components such as a video processor, video and audio encoders, etc.

In some implementations the logic (e.g., as implemented by the control circuit 32) that controls the wireless communication interface 18 is a so-called lower layer protocol architecture, and may include a physical layer, a medium access layer, a radio resource control layer, etc. This may be referred to as a modem entity of the UE 14. Further, in some implementations, the logic controlling the video media client and corresponding video content encoding, and any related functions, is a so-called higher layer architecture, and may include an IP layer, an application layer, etc. This logic may be referred to as an application entity, and may include an uplink video streaming client. With this separation in layers, in some implementations, the wireless modem entity communication with the cellular base station 30 is separated logically from the application entity data communication carried out with the ingestion point 12.

The network system 10 may include a device that provides network assistance services to the UE 14 and/or the ingestion point 12 during uplink streaming. For ease of description, the network assistance device will be referred to as a DASH-aware network element (DANE) 42. While DASH refers to dynamic adaptive streaming over hypertext transfer protocol (HTTP), the DANE 42 may provide network assistance to uplink streaming that is carried out according to additional and/or other protocols, such as HTTP live streaming (HLS), real time transmission protocol (RTP), real time messaging protocol (RTMP), etc.

The DANE 42 may include operational components for carrying out various functions of the DANE 42 including providing uplink network assistance services to the UE 14 and/or ingestion point 12. Among other components, the DANE 42 may include a control circuit 44 that is responsible for overall operation of the DANE 42, including controlling the DANE 42 to carry out the operations described in greater detail below. The control circuit 44 includes a processor 46 that executes code 48, such as an operating system and/or other applications. The functions described in this disclosure document may be embodied as part of the code 48 or as part of other dedicated logical operations of the DANE 42. The logical functions and/or hardware of the DANE 42 may be implemented in other manners depending on the nature and configuration of the DANE 42. Therefore, the illustrated and described approaches are just examples and other approaches may be used including, but not limited to, the control circuit 44 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 48 and any stored data (e.g., data associated with the operation of the DANE 42) may be stored on a memory 50. The code 48 may be embodied in the form of executable logic routines (e.g., a software program) that are stored as a computer program product on a non-transitory computer readable medium (e.g., the memory 50) of the DANE 42 and are executed by the processor 46. The functions described as being carried out by the DANE 42 may be thought of as methods that are carried out by the DANE 42.

The memory 50 may be, for example, one or more of a buffer, a flash memory, a hard drive, a removable media, a volatile memory, a non-volatile memory, a random access memory (RAM), or other suitable device. In a typical arrangement, the memory 50 includes a non-volatile memory for long term data storage and a volatile memory that functions as system memory for the control circuit 44. The memory 50 is considered a non-transitory computer readable medium.

The DANE 42 includes communications circuitry that enables the DANE 42 to establish various communication connections. For instance, the DANE 42 includes a network interface 52 over which communications are conducted with the ingestion point 12, the UE 14 and any other devices via the network medium 16.

In the illustrated embodiment, the network assistance DANE 42 is implemented as a server that is out-of-band of the media delivery path of the content transmitted over the uplink stream from UE 14 to ingestion point 12. With an out-of-band architecture it is possible that the communication between the UE 14 and the DANE 42 is independent of communication between the UE 14 and the media ingestion point 12. Therefore, communications between the UE 14 and the DANE 42 may occur in a separate communication path and/or data link than the communication path and/or data link used for the uplink steam. As such, the DANE 42 may be provided at various locations in the network system 10. For example, the DANE 42 may communicate with the UE 14 through the base station 30 as illustrated, through a different base station, or directly with the UE 14. In another embodiment, the functionality of the DANE 42 may be made part of the ingestion point 12.

The network system 10 also may include a media consumption device 54. Data streamed from the UE 14 to the ingestion point 12 (via the base station 30 and its uplink data path) may be delivered to the media consumption device 54. In one embodiment, the ingestion point 12 temporarily buffers the streamed data received from the UE 14 and delivers the data through the network medium 16 using an appropriate protocol, the details of which need not be discussed in detail for the purposes of this disclosure. In the case where the UE 14 is a video camera, the media consumption device 54 may be part of a television studio that processes, stores and/or redistributes the audiovisual content received from the UE 14 to media players (e.g., TVs, smart phones, handheld devices, etc.). The content may be consumed by end users in a "tape-delayed" or "live" manner on the media players. In other situations, the media consumption device 54 may be an end user device, or one of many end user devices that receive the media stream via a broadcast or multicast retransmission from the ingestion point 12 or other device (e.g., a retransmission server connected to the ingestion point 12).

C. Network Assistance for Uplink Streaming

Signaling

For purposes of description, there are three signaling paths of primary interest. More signaling flows are possible. Also, only the most germane aspects of the three identified signaling paths are described in this disclosure since the person of ordinary skill in the art will understand how to implement remaining details.

The first relates to modem communication between the wireless interface 18 in the UE 14 (e.g., cellular modem) and the cellular network. This may include radio communications between UE 14 and the base station 30, as well as general control signaling between UE 14 and core network nodes.

The second relates to application communication between the UE 14 (e.g., by the video client application) and the ingestion point 12. This may be considered application data and includes the data (e.g., audiovisual content and/or other media content) that is transferred, often in segments or as a continuous stream, and related control signaling (e.g., HTTP DASH or other segment flow control). As will be described, this disclosure proposes an arbitrary segmentation to assist in flow control over continuous stream protocols. Thus, in one embodiment, an end-to-end signaling path is established between the UE application entity and the ingestion point 12. This signaling path may be made in accordance with a DASH/HTTP protocol, an HLS protocol, an RTP protocol, an RTMP protocol, or other protocol for media delivery between a UE client and an ingestion point for uplink video streaming.

The third relates to a protocol, as newly proposed in this disclosure, between the application layer of the UE 14 (e.g., the video client application) and the DANE 42. This signaling may be considered a separate application layer signaling exchange than other application layer signaling of the UE 14. By way of this signaling, the UE 14 and its video or other relevant client application exchanges support information that improves the flow control of the streamed data.

Figure 2:
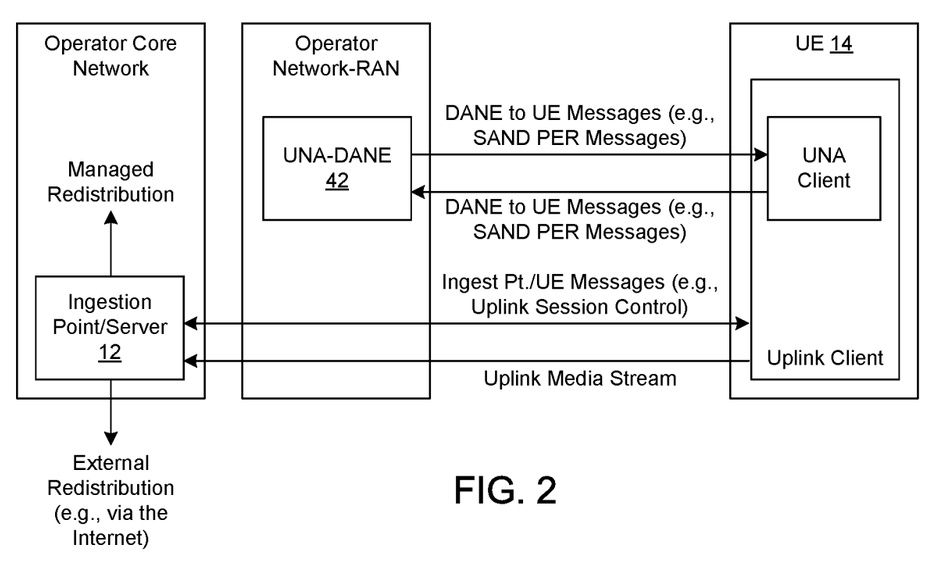
FIG. 2 is a representative high-level architectural diagram of uplink network assistance.

FIG. 2 is a high-level architectural diagram of uplink network assistance that shows some of these signal flows and may be referenced in connection with the following descriptions as a representative approach to UNA.

In one embodiment, to assist in providing an improved quality of experience for the uplink video streaming, this third signaling path may be established for network assistance (NA). Therefore, to implement NA functions, a signaling approach between the UE 14 and the DANE 42 may be established. In one embodiment this NA signaling approach is established between the UE media streaming application entity and the DANE 42. In one embodiment, the disclosed NA functions may use message envelopes employed by existing standards and descriptions, but with appropriate modifications for support of uplink streaming.

For example, the moving picture experts group (MPEG) server and network assisted DASH (SAND) promulgates a general approach to network assistance for supporting the transmission of streamed content from a network to a UE over a downlink. For instance, network assistance that is provided by a DANE may be applied to media content in the 3GPP DASH format. In one embodiment, the present techniques add a new DANE mode for uplink network assistance (UNA). As will be described, the UNA may apply to a wider range of content than formats based on MPEG-DASH, but re-uses MPEG-DASH-SAND signaling and messages to facilitate the UNA function. In an exemplary embodiment, the present disclosure makes use of, and builds upon, the media delivery network assistance feature as specified in 3GPP DASH TS 26.247 V15.0.0, and defines extensions where necessary for an uplink stream provision.

General Operation

Under current protocols, the network system 10 has little possibility to determine and communicate an estimated maximum possible capacity (e.g., a bit rate in bits per second) available to the UE 14 for sending a media stream in an uplink to the ingestion point 12. One method under current protocols that the UE 14 can use to select suitable media rates and adapt the uplink video transfer is to analyze historic variations in the uplink data link characteristics. Such characteristics could be related to metrics based on data rates, delays, packet losses, signal strengths, signal quality or similar. However, there is a clear limitation in the possibility to determine upcoming data link capacity in the uplink based on historical values. Therefore, the UE 14 does not have a mechanism by which it may select a most appropriate media format and/or quality level for an upcoming uplink media stream of data or on a segmented basis of the uplink media stream.

As indicated, the uplink delivery protocol of the end-to-end media stream between the UE video client and the ingestion point 12 may be, but is not necessarily, DASH/HTTP. Another option is HLS. These approaches apply a segmented delivery method where audiovisual content is broken into segments for delivery. Each segment typically relates to a relatively short period, for example from less than one second to several seconds of audiovisual information. In other embodiments, the uplink delivery protocol may deliver data as a continuous media stream rather than a series of media stream segments. Examples of continuous media stream protocols include RTP and RTMP.

To implement some functions, pseudo-segmentation may be applied when the data is transmitted in a continuous media stream. For example, a predetermined segment length in terms of a temporal length of audiovisual content may be defined. Then, the audiovisual content may be logically divided into segments that each contain audiovisual content corresponding to the predetermined segment length. Exemplary predetermined segment lengths include, but are not limited to 500 milliseconds (ms), 650 ms, 1 second, 2 second, etc. of audiovisual information. Other fractions of seconds may be used for the predetermined segment length. Thus, when the media stream is a format that uses a continuous streaming protocol and a segment structure is not directly apparent in the media stream, a segmentation approach may be artificially superimposed on the data stream between the UE video client and the ingestion point 12.

The predetermined segment length also may be a time period value for which uplink network assistance (UNA) information provided by the DANE 42 is valid and used by the UE 14 to set the bit rate and/or stream quality. Thus, for segmented audiovisual data (e.g., as found in a DASH or under the pseudo-segmentation of a continuous streaming protocol), UNA information may be used by the UE 14 on a segment by segment basis to set the bit rate and/or video quality for each segment. In other cases, the UNA information provided by the DANE 42 could be valid until a change is made (e.g., the UNA period is indefinite) or for a period of time containing multiple segments. In this case, the UE 14 may maintain delivery of the same bit rate or media stream quality until a change is indicated by the UNA information from the DANE 42 or the UNA information expires. This approach may be applied in the exemplary situation where the audiovisual stream is sent by a camera of a professional media organization covering a news event or other event in which a bit rate capacity reservation has been made to accommodate an uplink of a pre-defined quality level. In this case, UNA information at the beginning of each UNA period (e.g., seconds, minutes, or a predetermined number of segment lengths) may be applied to the data streamed during the UNA period.

With UNA, the DANE 42 has the possibility to notify or recommend the UE 14 to choose a different bit rate and/or quality of the media stream in response to UNA request sent by the UE 14 to the DANE 42. As indicated, in this scenario, the ingestion point 12 is a server entity that may be located in any part of a network (e.g., a server connected to the Internet or a server located within an operator core network in case of an operator controlled media streaming service) that receives the uplink media stream. Typically, the ingestion point has a connection with the UE video source client application entity using MPEG DASH or other media streaming protocol, but the ingestion point typically has no knowledge about the underlying transport network characteristics on which the uplink media stream is transferred. As will be discussed, the disclosed approach provides this opportunity, so that the UE application entity may communicate with a network element that is expected to have information about the underlying transport network characteristics. Also, aspects of the disclosed approach may be applied to content delivered in formats other than MPEG-DASH or an MPEG-DASH derivative (e.g. 3GPP-DASH, DVB-DASH, CMAF). These and other attributes may be accomplished using network assistance messages. Such network assistance messages also may be used for downlink network assistance, but for UNA there is a different logic and set of semantics associated with the network assistance messages.

UNA is based on the model of the client (e.g., the UE 14 acting as the source of live streaming) requesting network assistance and the DANE 42 responding to the request. The UNA functionality may be granted to the UE 14 to support the provision of streamed audiovisual content. The UNA functionality may include one or both of:

The DANE 42 may indicate to the UE 14 information indicative of a highest suitable media rate for the next media segment or time period. The indication may be based on or specify one of plural content versions available from the UE 14 or a DASH representation of the content item. In one embodiment, this information may be obtained by the UE 14 using a call. For example, once a UNA session is active, the UE 14 may issue a network assistance call (e.g., a single logical signaling exchange with the DANE 42) prior to delivering the next media segment to the ingestion point.

The DANE 42 may indicate to the UE 14 that the UE 14 should cache one or more media segments and then resume uplink delivery, potentially delivering the cached data in a temporary delivery boost (e.g., by sending multiple segments in bulk). This, in essence, temporarily pauses the media stream. One situation in which this action may be taken is when uplink data capacity is temporarily limited, such as due to radio link fading or other congestion situations. In that case, the DANE 42 may signal that it intends to temporarily control the UE 14 to pause the upload during the streaming session. With this signaling included in the network assistance functionality, there is an opportunity for the streaming application in the client to be aware of a situation where streaming performance would benefit from caching.

Various additional aspects of UNA may include the following. Discovery of the DANE 42 (e.g., the network element providing uplink network assistance support) by the UE 14. Initiation and termination of the UNA network assistance support session. Definition of messages used between the UE 14 and the DANE 42. Application programming interface (API) for UNA and DANE 42 access in the media stream uplink function of the UE 14.

The various UNA functions and implementing aspects improve the state of the art of 3GPP-based mobile networks and network assistance to provide an implementable solution for UNA.

Discovery of the Network Assistance Support Element (e.g., the DANE)

In one embodiment, a UNA mode may be defined and added to the set of server and network assisted DASH (SAND) modes, which so far consist of DANE modes for downlink media stream transfer support. Thus, a DANE that supports the new UNA mode results in the DANE 42. The DANE 42 may be locatable by using the DNS protocol, by referring to a fully qualified domain name (FQDN) in which a first label refers to the UNA support mode of the DANE 42. On connection to the DANE 42, the UE 14 may send a status message with its client capabilities in order to inform the DANE 42 about the SAND mode(s) that the UE 14 supports.

Initiation and Termination of Network Assistance Support Session

Once the UE 14 has obtained the IP address of the DANE 42 that supports UNA, the UE 14 may communicate with the DANE 42 for the purpose of accessing the supported UNA functions. Communications may involve registration of the UE 14 with the DANE 42, which may include or may be interpreted as a notification to the DANE 42 that the UE 42 may request UNA facilities at some time in the future while the UE 42 is operational and/or in the process of transmitting streamed media. The registration process or a separate process may initiate a UNA session between the UE 14 and the DANE 42. For example, the UE may initiate a UNA session by sending an appropriate request message to the DANE 42. For purposes of registration and/or UNA session initiation, one or more new MPEG SAND message(s) or 3GPP-specific SAND message(s) may be defined.

A UNA session may be valid for all media stream uplink applications and/or activities that operate concurrently in the UE 14. Alternatively, a separate UNA session may be initiated for each media stream uplink application and/or each streamed content item.

The scope of the UNA session may depend on the application being run (e.g., executed) to send streaming media from the UE 14 to the base station 12. For an application that has the primary purpose of transmitting streaming media content, then the scope of the UNA session may be from the launch of the application until the application is terminated. The scope may be more limited for an application that has functions other than transmitting streaming media content.

The UE 14 may terminate a UNA session using an appropriate message exchange with the DANE 42.

In an exemplary embodiment, the UE 14 functions as a 3GPP-DASH client and initiates a UNA session by sending a NetworkAssistanceInitiation SAND extension message to the DANE 42 within a SAND message envelope. The generic procedure for the UNA session initiation request is shown in Table 1.

TABLE 1

| Function call | Originator to Destination | Parameters |
|---|---|---|
| UNA session initiation request | UE to DANE | Destination entity IP address, media delivery port number session id, port number, websocket requirement |
| UNA session initiation response | DANE to UE | |

An exemplary UNA session initiation request message syntax for uplink mode is shown in Table 2.

TABLE 2

| Parameter | Type | Cardinality | Description |
|---|---|---|---|
| SAND Message = UplinkNetworkAssistanceInitiationRequest | Object | 1 | |
| DestinationEntityIPAddress | String | 1 | IP address of the entity receiving the stream or content segments in the present UNA session. |
| DestinationEntityPortNumber | Integer | 1 | Port number for delivery of stream or content segments in the present UNA session. |

In one embodiment, a UNA initiation request message (UplinkNetworkAssistanceInitiationRequest message) may be carried in a SAND message envelope, such as specified in ISO/IEC 23009-5, with one or more adaptations or modifications. One adaptation may be that the senderID element is included in order to provide a reference by which the session initiation request may be authenticated or otherwise authorized at the DANE 42 or elsewhere in the network after being relayed by the DANE 42 that receives the message. Another adaptation may be that the generationTime element is omitted. Another adaptation may be the messageId element is omitted. In one embodiment, the UplinkNetworkAssistanceInitiationRequest message is defined in the schema whose @schemeIdUri is: "urn:3gpp:dash:chema:sandmessageextension:2017."

The DANE 42 may reply with a UNA session initiation response message. For purposes of generating the response, the DANE 42 has access to or is provided with information about network conditions at the wireless interface between the UE 14 and the ingestion point. The information may include one or more of spectrum utilization, congestion, number of users, throughput metrics, packet and bit rate loss metrics, fading, etc.

The UE 14 may terminate a UNA session by sending the UplinkNetworkAssistanceTermination SAND extension message to the DANE 42 within a SAND message envelope, with parameter SessionID as allocated by the DANE 42 when the session was initiated.

Uplink Media Stream Parameter Negotiation and Information Exchange

Since uplink media streams may be for professional usage (e.g., during remote or mobile news gathering, or other event coverage), it may be desirable to achieve a sustained quality level of the media stream. To support sustained quality level of the media stream, the UE 14 and the DANE 42 may negotiate characteristics of the uplink media stream prior to the start of media stream delivery.

For each media segment or UNA period, the UE 14 may send a UNA request message to the DANE 42. In one embodiment, the UNA request message sent from the UE 14 to the DANE 42 may be implemented with the SAND status message SharedResourceAllocation. The UNA request message triggers the DANE 42 to provide UNA information to the UE 14 about available media bit rates for the media stream or content item to be transmitted on the uplink via streaming. The UNA request message, whether implement using the SharedResourceAllocation or in another format, may contain various information items for the DANE 42 such as the media bit rates (e.g., media formats or quality levels) available from the UE 14. For example, the operationPoints in the SAND message SharedResourceAllocation may be populated with one or more bandwidth parameters representing each of the available media bit rates that may be transmitted by the UE 14, which are indicated as the sum of all media components (e.g., video and audio) in each case. The quality parameter of each of the operationPoints may be used to indicate the quality ranking among all of the available versions.

The UNA request message also may signal that the UE 14 is a source authorized to be provided with UNA services and/or to receive priority treatment, such as greater bandwidth resources than would be provided to non-priority devices. An exemplary UE 14 of this nature is a video camera operated by a professional news or event reporting organization that has previously registered with the DANE 42 or a network operator. In one embodiment, the allocationStrategy and weight parameters of the SharedResourceAllocation message may be used to indicate that the UNA session is for a data stream containing professional quality audiovisual content from an authorized source (e.g., a source that has been deemed to have priority for delivery to the network due to an existing commercial arrangement between the provider of the uplink stream and the network). In one embodiment, the allocationStrategy is set to a value "premium-privileged" to indicate the status. Furthermore, the weight and/or quality parameters may be used to convey an authentication code or security token as previously arranged between the UE 14 and the network to facilitate verification that the UE 14 is to be given preferential treatment.

In response to the UNA request message, the DANE 42 may send a UNA response message to the UE 14. In one embodiment, the UNA response message may use the message envelope of the SAND parameter enhancing reception (PER) message SharedResourceAssignment. The UNA response message may provide a recommended choice of bit rate version for the next segment (or UNA period) of the content item provided on the uplink. Alternatively, and possibly independent of a previous UNA request message from the UE 14, the UNA response message may be used by the DANE 42 to inform the UE 14 of an estimated maximum bit rate available for the uplink stream.

As previously described, the DANE 42 may request that the UE 14 temporarily cache data to accommodate degraded network conditions. To implement this function, the UNA response message may include a request by the DANE 42 for the UE 14 to conduct caching for a specified number of segments and to transmit at least some of the cached segments in bulk. This would invoke the segment caching functionality in the UE 14 and, subsequently, expedite the burst transmission of the cached data at the appropriate time. In effect, the DANE 42 may control the caching functionality of the UE 14 and, thus, control the transmit buffer of the UE 14.

Other status information may be exchanged in the UNA request and/or UNA response messages. For instance, status information provided by the UE 14 may include the intended bit rate of upcoming segments of a video transmission. Alternatively, or additionally, UE 14 status information may be related to suggested UE 14 transmissions of multiple segments in bulk. For instance, the UE 14 may report an overheating situation or other reason for which it would like to use a bulk transmission of multiple segments.

Bit Rate Selection and Media Player Description for Uplink Data Source

Under normal UNA operation, the DANE 42 assists the UE 14 in determining an appropriate bit rate to employ during the transmission of data (e.g., audiovisual data) through a live streaming interface with the ingestion point. For example, through the use of UNA request message, the UE 14 requests the DANE 42 to respond with an indication of the highest bit rate that the UE 14 may transmit during the next segment, pseudo-segment or UNA period. The DANE 42 responds with this information in the UNA response message.

In some situations, the network may encounter a condition under which it would like to set, or change the media stream version (i.e., the quality level or bit rate delivered by the client due to network operational issues). In this case, the DANE 42 may recommend the new or changed bitrate version by using the same SAND PER message SharedResourceAssignment as that used in response to a preceding SharedResourceAllocation message, but in an unsolicited manner. The reasons for the ingestion point to do this may include, but are not limited to, network operational issues, the media transfer application preferring a different version of the media stream, etc.

In one embodiment, the UE 14 may associate a MPEG-DASH compliant media presentation description (MPD) to advertise the available versions of the content to the ingestion point. The MPD specifies the different versions of the streamed media that are available from the UE 14. The UE 14 may provide information about its media player description (MPD) to the ingestion point 12 in embodiments where the UE 14 makes more than one version (e.g., quality level) of the media available for streaming. This information also may be communicated to the DANE 42 to support normal UNA operations.

In one embodiment, the information about the MPD may be provided in a format that supplies a location from which the ingestion point and/or the DANE 42 may access or retrieve the complete MPD corresponding to the content item being streamed. For instance, the mpdUrl parameter in the SharedResourceAllocation message may provide the location from which the complete MPD of the content item and its available versions being offered to the network in the uplink session may be retrieved. In one embodiment, the location may be specified in the form of a URL.

The location of the MPD may be hosted by the UE 14 or hosted by a server on the Internet or network medium 16. In one embodiment, the UE 14 may be capable of dynamically managing the versions of content offered based on current network conditions and may update the MPD accordingly. In another embodiment, the MPD and associated content versions may be static. For instance, the version offerings made by the UE 14 and identified in the MPD may be predetermined, such as being limited to a fixed set of versions of which one may be selected depending on the instantaneous network conditions affecting uplink data handling capability. For example, the camera assembly 40 may be able to provide several versions of its captured video for live stream, such as SD, HD, ultra-HD (UHD), and 360° VR versions, and make corresponding offerings in the MPD. A static MPD may be valid for several devices of the same product type or in the same product family as the UE 14.

In some situations, the ingestion point 12 may encounter a condition under which the ingestion point 12 would like to set, or change the media stream version (i.e., the quality level or bit rate delivered by the client). The reasons for the ingestion point to do this include, but are not limited to, the media transfer application preferring a different version of the media stream.

Should the ingestion point 12 encounter a condition under which the ingestion point 12 would like to change the bit rate delivered by the UE source client (e.g., to a lower or a higher bit rate version), the ingestion point may request a different version of the content from the UE 14. This condition may occur in the event of a predicted buffer underrun in the ingestion point or if higher or lower quality audiovisual content is desired at the media consumption device 54. This request is part of the communication between the ingestion point 12 and the UE (e.g., outside the scope of UNA), but the UE 14 may use UNA in order to attempt to comply with such a request. In this event, the UE 14 may send a request to the DANE 42 informing the DANE 42 of the version that the ingestion point 12 has requested to determine if the UE 14 can deliver the requested version under current network conditions. The DANE 42 either confirms or denies approval to select the new media stream version. The UE 12 may then confirm or deny the request from the ingestion point 12 to change the media stream version being transmitted on the uplink.

D. Conclusion

Although certain embodiments have been shown and described, it is understood that equivalents and modifications falling within the scope of the appended claims will occur to others who are skilled in the art upon the reading and understanding of this specification.

What is claimed is:
1. A method of streaming data from a user equipment (UE) to an ingestion point in a network, comprising:
establishing an uplink network assistance (UNA) session with a network assistance service of the network, the data streamed to the ingestion point over a live streaming interface with the ingestion point that is separate from the UNA session and the streaming occurring over plural UNA periods, wherein the data is segmented into segments for transmission according to a data streaming protocol that defines data segmentation; and while streaming of the data, receiving from the network assistance service an indication of a recommended highest bit rate estimate with which the data may be streamed under current network conditions, wherein the indication is received for each of the plural UNA periods, wherein each UNA period of the plural UNA periods is defined by a period of time containing multiple segments of the data, and wherein the UNA period is defined by a predetermined number of segment lengths.

2. The method of claim 1, wherein the UE selects a data stream configuration from an available set of capabilities to supply an uplink media stream that complies with the recommendation.

3. The method of claim 1, wherein the network assistance service is hosted by a network element configured to provide UNA services using standard message envelopes that support network assistance under dynamic adaptive streaming over hypertext transfer protocol (HTTP) (DASH), the network element being a DASH-aware network element (DANE).

4. The method of claim 3, wherein the standard message envelopes are server and network assisted DASH (SAND) message envelopes.

5. The method of claim 1, further comprising, in response to a cache command from the network assistance service, caching one or more segments of the data.

6. The method of claim 5, further comprising sending multiple cached segments in bulk.

7. A method of streaming data from a user equipment (UE) to an ingestion point in a network, comprising:
   establishing an uplink network assistance (UNA) session with a network assistance service of the network, the data streamed to the ingestion point over a live streaming interface with the ingestion point that is separate from the UNA session and the streaming occurring over plural UNA periods, wherein the data is segmented into segments for transmission according to a data streaming protocol that defines data segmentation; and
   while streaming of the data, receiving from the network assistance service an indication of a recommended highest bit rate estimate with which the data may be streamed under current network conditions, wherein the indication is received for each of the plural UNA periods, wherein each UNA period of the plural UNA periods is defined by a period of time containing multiple segments of the data;
   receiving a request from the ingestion point to change a quality level of the content of the data stream to a requested quality level; and
   requesting confirmation from the network assistance service that the quality level requested by the network ingestion point is recommended under current network transmission conditions.

8. The method of claim 1, wherein the UE is authenticated to the network assistance service as part of a UNA message sent to the network assistance service as having pre-arranged authorization to be granted access to at least one of the UNA services or priority access to network bandwidth resources.

9. The method of claim 8, wherein the UNA message conforms to a standard message envelope to support network assistance under dynamic adaptive streaming over hypertext transfer protocol (HTTP) (DASH) and one or more fields of the UNA message conveys an authentication code or security token.

10. A user equipment comprising a wireless interface and a control circuit configured to carry out the method of claim 1.

11. A method of providing uplink network assistance (UNA) by a network assistance service to a user equipment (UE) during streaming of data from the UE to an ingestion point in a network, comprising:
    establishing an uplink network assistance (UNA) session with the UE, the UNA session being separate from a live streaming interface between the UE and the ingestion point over which the data is streamed and the streaming occurring over plural UNA periods, wherein the data is segmented into segments for transmission according to a data streaming protocol that defines data segmentation;
    while streaming of the data, receiving from the UE a network assistance request; and
    responding to the UE with a network assistance response indicating a highest bit rate recommendation with which the data may be streamed under current network conditions for each of the plural UNA periods, wherein each UNA period of the plural UNA periods is defined by a period of time containing multiple segments of the data, and wherein the UNA period is defined by a predetermined number of segment lengths.

12. The method of claim 11, wherein the network assistance service is hosted by a network element configured to provide UNA services using standard message envelopes that support network assistance under dynamic adaptive streaming over hypertext transfer protocol (HTTP) (DASH), the network element being a DASH-aware network element (DANE).

13. The method of claim 12, wherein the standard message envelopes are server and network assisted DASH (SAND) message envelopes.

14. The method of claim 11, further comprising authenticating that the UE is eligible for UNA services or priority access to network bandwidth resources by verifying data in a UNA message received from the UE.

15. The method of claim 1, further comprising, before delivering data in each UNA period over the live streaming interface, the UE requesting network assistance from the network assistance service, the received indication being received in a reply to the request for network assistance.

* * * * *